United States Patent
Miyamura et al.

(10) Patent No.: US 10,437,511 B2
(45) Date of Patent: Oct. 8, 2019

(54) DATA ACCESS ON TAPE

(71) Applicant: International Business Machines Corporation, Armonk, NY (US)

(72) Inventors: Tsuyoshi Miyamura, Tokyo (JP); Eiji Ogura, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 15/359,087

(22) Filed: Nov. 22, 2016

(65) Prior Publication Data

US 2018/0143783 A1 May 24, 2018

(51) Int. Cl.
*G06F 3/06* (2006.01)

(52) U.S. Cl.
CPC ............ *G06F 3/0656* (2013.01); *G06F 3/061* (2013.01); *G06F 3/0682* (2013.01)

(58) Field of Classification Search
CPC ...... G06F 3/0656; G06F 3/061; G06F 3/0653; G06F 3/0682
See application file for complete search history.

(56) References Cited

U.S. PATENT DOCUMENTS

| | | | |
|---|---|---|---|
| 7,023,651 B1 | 4/2006 | Peterson | |
| 8,665,542 B2 | 3/2014 | Katagiri | |
| 8,917,472 B2 | 12/2014 | Abe et al. | |
| 9,442,863 B1 * | 9/2016 | Kelkar | G06F 12/128 |
| 2005/0144394 A1 * | 6/2005 | Komarla | G06F 12/0862 711/137 |
| 2005/0154825 A1 * | 7/2005 | Fair | G06F 3/0611 711/113 |
| 2005/0253858 A1 * | 11/2005 | Ohkami | G06F 12/0862 345/531 |
| 2012/0162807 A1 | 6/2012 | Katagiri et al. | |
| 2012/0293886 A1 * | 11/2012 | Abe | G06F 3/0613 360/51 |
| 2015/0095566 A1 | 4/2015 | Itagaki et al. | |

OTHER PUBLICATIONS

"Maximizing Tape Performance with StorageTek T10000 Tape Drives" Oracle Storage Tek, An Oracle White Paper, Sep. 2013, 19 pages.

* cited by examiner

*Primary Examiner* — Nanci N Wong
(74) *Attorney, Agent, or Firm* — Kinzler Bean & Adamson

(57) ABSTRACT

The method includes receiving a read request for a record stored on the tape. The tape is mounted in a tape drive which includes a data buffer. The tape stores data as a plurality of data sets. Each of the plurality of data sets contains one or more records. The method also includes buffering at least one of the plurality of data sets to the data buffer. At least one of the plurality of data sets includes a target data set which includes the requested record. The method also includes monitoring read operations on the tape to count a number of continuous read operations occurring in a backward direction relative to the tape. The method also includes, in response to the number of continuous read operations reaching a threshold, activating a read-behind mode that executes an extended buffer operation on data preceding a record requested to be read next.

15 Claims, 5 Drawing Sheets

DATA ACCESS ON TAPE

FIELD

The subject matter disclosed herein relates to tape data storage systems and more particularly relates to data access on tape data storage systems.

BACKGROUND

Tape drives, such as a linear tape data storage system, provide storage on a magnetic tape. Traditionally, tape drives are used for backup or archival storage in which data is written to the tape in a sequential order and read from the tapes in the same order. While these sequential read/write versions previous iterations of the tape drive may be limited to sequential access, conventional tape drive access systems can mimic the operation of a conventional disc or flash drive in that they can provide non-sequential access to data stored on the tape. This access is provided by moving the tape relative to a read head until the head is aligned with a portion of the tape on which the desired data is written.

BRIEF SUMMARY

A method for accessing a tape is disclosed. The method includes receiving a read request for a record stored on the tape. The tape is mounted in a tape drive which includes a data buffer. The tape stores data as a plurality of data sets. Each of the plurality of data sets contains one or more records. The method also includes buffering at least one of the plurality of data sets to the data buffer. At least one of the plurality of data sets includes a target data set which includes the requested record. The method also includes monitoring read operations on the tape to count a number of continuous read operations occurring in a backward direction relative to the tape. The method also includes, in response to the number of continuous read operations reaching a threshold, activating a read-behind mode that executes an extended buffer operation on data preceding a record requested to be read next.

A system is also disclosed. The system includes a memory, a tape drive, and a processor. The tape drive includes a data buffer. The processor is communicatively coupled to the memory and the tape drive. The memory includes instructions which, when executed by the processor cause the processor perform several operations. The instructions cause the processor to receive a read request for a record stored on a tape mounted in the tape drive. The tape stores data as a plurality of data sets. Each of the plurality of data sets contain one or more records. The instructions also cause the processor to buffer at least one of the plurality of data sets to the data buffer. The at least one of the plurality of data sets includes a target data set. The target data set includes the requested record. The instructions also cause the processor to monitor read operations on the tape to count a number of continuous read operations occurring in a backward direction relative to the tape. The instructions also cause the processor to, in response to a determination that the number of continuous read operations has reached a threshold, activate a read-behind mode that executes an extended buffer operation on data preceding a record requested to be read next.

A computer program product for accessing a tape is also disclosed. The computer program product includes a computer readable storage medium having program instructions embodied therewith. The program instructions are executable by a processor to cause the processor to receive a read request for a record stored on the tape mounted in a tape drive. The tape drive includes a data buffer. The tape stores data as a plurality of data sets. Each of the plurality of data sets contains one or more records. The program instructions also cause the processor to buffer at least one of the plurality of data sets to the data buffer. The at least one of the plurality of data sets includes a target data set. The target data set includes the requested record. The program instructions also cause the processor to monitor read operations on the tape to count a number of continuous read operations occurring in a backward direction relative to the tape. The program instructions also cause the processor to, in response to a determination that the number of continuous read operations has reached a threshold, activate a read-behind mode that executes an extended buffer operation on data preceding a record requested to be read next.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not, therefore, to be considered as limiting of scope, the embodiments will be described and explained with additional specificity and detail through the accompanying drawings, in which.

DETAILED DESCRIPTION

Figure 1:
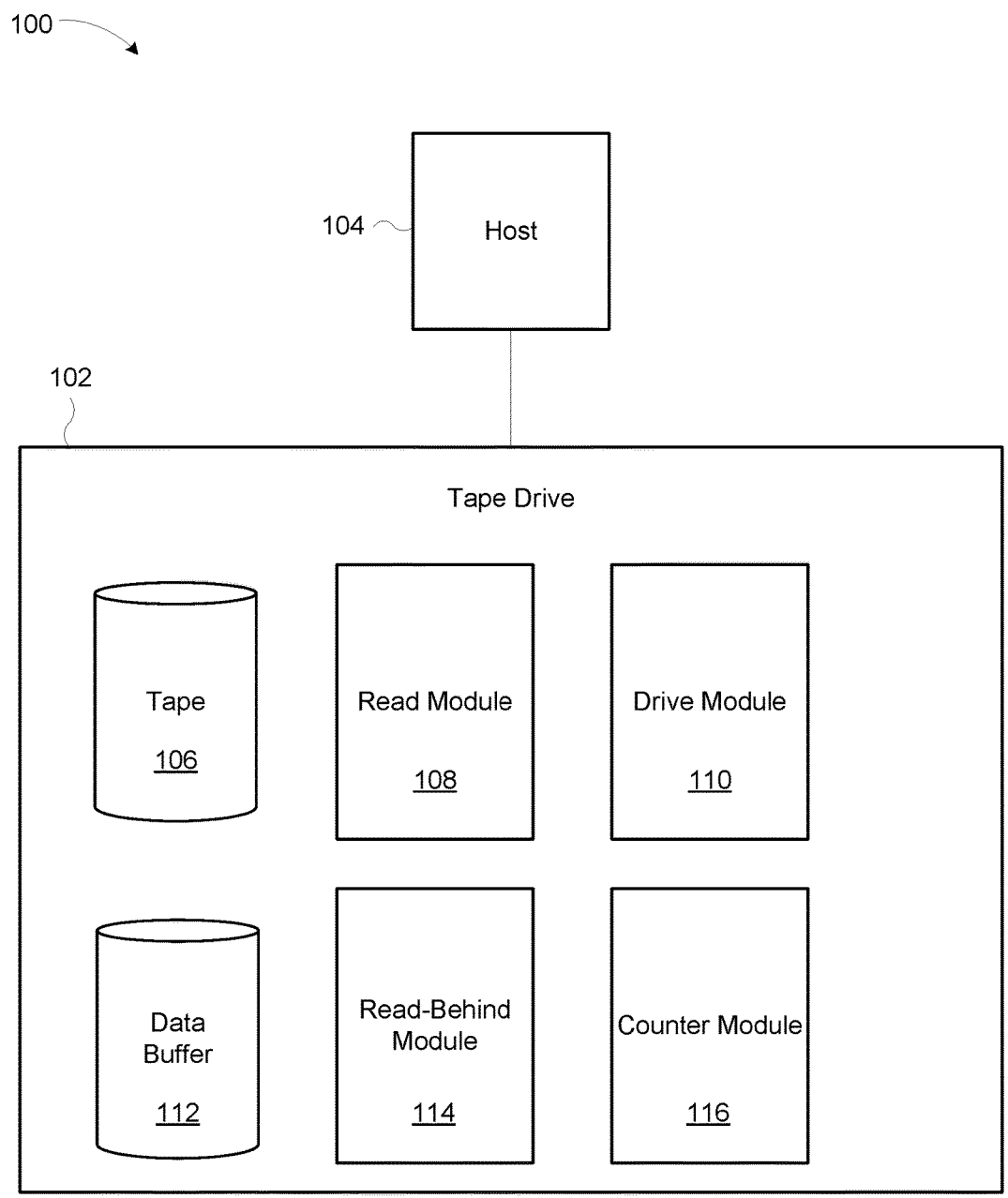
FIG. 1 is a schematic block diagram illustrating one embodiment of a storage management system in accordance with the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The computer program product may be deployed by manually loading directly in the client, server and proxy computers via loading a computer readable storage medium such as a CD, DVD, etc., the computer program product may be automatically or semi-automatically deployed into a computer system by sending the computer program product to a central server or a group of central servers. The computer program product is then downloaded into the client computers that will execute the computer program product.

Alternatively the computer program product is sent directly to the client system via e-mail. The computer program product is then either detached to a directory or loaded into a directory by a button on the e-mail that executes a program that detaches the computer program product into a directory. Another alternative is to send the computer program product directly to a directory on the client computer hard drive. When there are proxy servers, the process will, select the proxy server code, determine on which computers to place the proxy servers' code, transmit the proxy server code, then install the proxy server code on the proxy computer. The computer program product will be transmitted to the proxy server and then it will be stored on the proxy server.

The computer program product, in one embodiment, may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally, the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. The CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers.

Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

The computer program product, in one embodiment, may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the computer program product (i.e. the software resides elsewhere) wherein the lifetime of the VPN is limited to a given period of time or a given number of deployments based on an amount paid.

The computer program product may be deployed, accessed and executed through either a remote-access or a site-to-site VPN. When using the remote-access VPNs the computer program product is deployed, accessed and executed via the secure, encrypted connections between a company's private network and remote users through a third-party service provider. The enterprise service provider (ESP) sets up a network access server (NAS) and provides the remote users with desktop client software for their computers. The telecommuters can then dial a toll-free number or attach directly via a cable or DSL modem to reach the NAS and use their VPN client software to access the corporate network and to access, download and execute the computer program product.

When using the site-to-site VPN, the computer program product is deployed, accessed and executed through the use of dedicated equipment and large-scale encryption that are used to connect a company's multiple fixed sites over a public network such as the Internet.

The computer program product is transported over the VPN via tunneling which is the process of placing an entire packet within another packet and sending it over a network. The protocol of the outer packet is understood by the network and both points, called tunnel interfaces, where the packet enters and exits the network.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved.

Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

Embodiments described below provide improved efficiency in accessing tape-based storage systems. Tape drives are traditionally sequential access devices frequently used for backup and archival purposes. However, tape drives may also be accessed in a random-access arrangement, similar to the manner in which disc or flash drives can be accessed.

One of the inefficiencies with using a tape drive in a random-access manner occurs when read requests are issued which are in a backward direction (i.e. a direction opposite the direction in which the read operation occurs). In this situation, the tape or read head must be moved from the end of the previous read to the beginning of the data requested to be read next. When the read request from a host is for data behind the previously read data, a rewinding or "back-hitching" of the tape or read head is performed to access the information.

In the following description, reference may be made to movement of the read head. Any such reference may include movement of the read head, movement of the tape, or a combination of both movement of the read head and movement of the tape.

Back-hitching requires time to perform the physical movement and introduces wear on the components. In some cases, the movement time can place a temporal penalty greater than the time needed to buffer the next requested record.

To avoid the frequent back-hitching required when data is requested which is behind the current position of the read head, embodiments described herein provide a read-behind mode. The read-behind mode which moves the read head or tape to buffer further ahead than normally required for a particular read request. The read-behind mode may be activated through the use of a counter to track a number of read operations which occur in a backwards direction. The read-behind mode may also be activated upon detection of a pattern in the read requests or other characteristics of the tape drive or communications from the host or other requesting entity.

With a larger move behind action, the tape drive can create a larger buffer and reduce the number of movements required of the tape drive to fulfill the read requests received by the tape drive. The larger amount of data allows the buffer of the tape drive to fulfill more backwards read requests from the buffer without having to perform separate mechanical movements of the read head. This improves the efficiency of accessing data on the tape drive. Further details on this and other embodiments are set forth below with reference to the various Figures.

FIG. 1 is a schematic block diagram illustrating one embodiment of a storage management system 100 in accordance with the present invention. The storage management system 100 includes a tape drive 102 and a host 104.

The tape drive 102 is connected to the host 104. The connection may be a wireless or wired connection over a local network, such as a LAN, or a global network, such as the Internet. The host 104 may be located within the same general geographical area as the tape drive 102 or located at a remote site. In some embodiments, the tape drive 102 may be located within the same computing device as the host 104. In other embodiments, the tape drive 102 and the host 104 may operate on different devices. Other arrangements of the tape drive 102 and the host 104 may also be implemented.

The tape drive 102 includes a tape 106, a read module 108, a drive module 110, a data buffer 112, a read-behind module 114, and a counter module 116. In some embodiments, the tape 106 is a linear magnetic tape. In some embodiments, the tape 106 is a film tape coated with magnetic material.

The tape 106 is capable of receiving in various recording processes. For example, the tape 106 may receive data in a linear, linear serpentine, transverse scan, arcuate scan, or other method. The tape 106 is capable of storing data in various formats. For example, the data on the tape 106 can be stored in blocks. Each block is sized based on the amount of data stored in each block. The blocks may be separated by a gap which may be constant. Larger block sizes may facilitate a greater data capacity for a given length of tape.

In some embodiments, the tape 106 is stored on a reel. The tape 106 is run past the read module 108. In some embodiments, the read module 108 is a read head. While the terms read module and read head are used herein, these terms may refer to a read head, a write head, or a read/write head or other device capable of both reading from and writing to the tape. The read module 108 detects magnetic variations in the magnetic tape and translates the variations into data.

In various embodiments, the read module 108 and/or the tape 106 are coupled to the drive module 110. The drive module 110 includes a motor, servo, or other device capable of imparting a force. For example, the drive module 110 may be connected to a reel on which the tape 106 is stored. The drive module 110 spools and unspools the tape 106 to move the tape 106 past the read module 108. The drive module 110 may alternatively or also be connected to the read module 108 to move the read module 108 relative to the tape 106. In some embodiments, the drive module 110 is managed by a controller which provides and monitors the operation of the drive module 110 to align the read module 108 with a location on the tape 106 at a location corresponding to a requested record to read from or write to the tape.

The data buffer 112 is capable of queuing data for writing to the tape 106 and for buffering data read from the tape 106. In some embodiments, the data buffer 112 is a disc drive or flash drive. Other storage devices may be used to provide storage for the data buffer 112. In response to a read request for a record, the tape drive 102 may move the tape 106 to align the read module 108 with a location on the tape 106 corresponding with the requested record.

In some embodiments, the data on the tape 106 is organized into data sets. Each data set includes one or more records. This is shown and described in greater detail below with reference to FIG. 2. The location for reading the requested record may be at the beginning of the data set which includes the requested record. In some embodiments, the tape drive 102 buffers the entire data set which includes the requested record. As the tape drive 102 buffers the target data set, the read module 108 moves along the physical length of the tape 106. At the completion of the buffering operation, the read module 108 will be located at the end of the physical location on the tape 106 at which the data set is stored.

In some embodiments, receipt of a request for a record which is not buffered and is located behind the present location of the read module 108 on the tape 106, causes the read module 108 to activate a read behind module 114. In the illustrated embodiment of the storage management system 100, the read-behind module 114 is a separate module of the tape drive 102. In other embodiments, the read-behind module is incorporated as part of the drive module 110, the read module 108, or other components within the tape drive 102. In other embodiments, the read-behind module 114 is located elsewhere in the tape drive 102.

The read-behind module 114 is activated in response to a trigger scenario. Trigger scenarios include a read request or number of consecutive read requests which require backward movement of the read module 108 or tape 106, a pattern in a series of read requests, a number of backward read requests per unit of time, or other scenarios. In some embodiments, the counter module 116 tracks backward oriented read requests. The counter module 116 may track consecutive backward oriented read requests. The counter module 116 or the read-behind module 114 may store a threshold which, once reached by the value counted by the counter module 116, triggers the read-bind module 114 to activate the read-behind mode. The counter module 116 may track other variables, conditions, or characteristics of the tape drive, read requests, or other communications or actions.

The read-behind module 114 causes the drive module to move the tape 106 or read module 108 further back than would be necessary to complete the read request so that additional data can be buffered from the tape. The additional data is stored to the data buffer 112 and accessed in response to a subsequent corresponding read request. Buffering larger quantities of data than normally done to fulfill the read request reduces the number of back-hitch movements which improves the read time and reduces component wear. Additional details relating to the data buffer 112 and the data stored thereon during the active read-behind mode is discussed below relative to FIG. 4.

Figure 2:
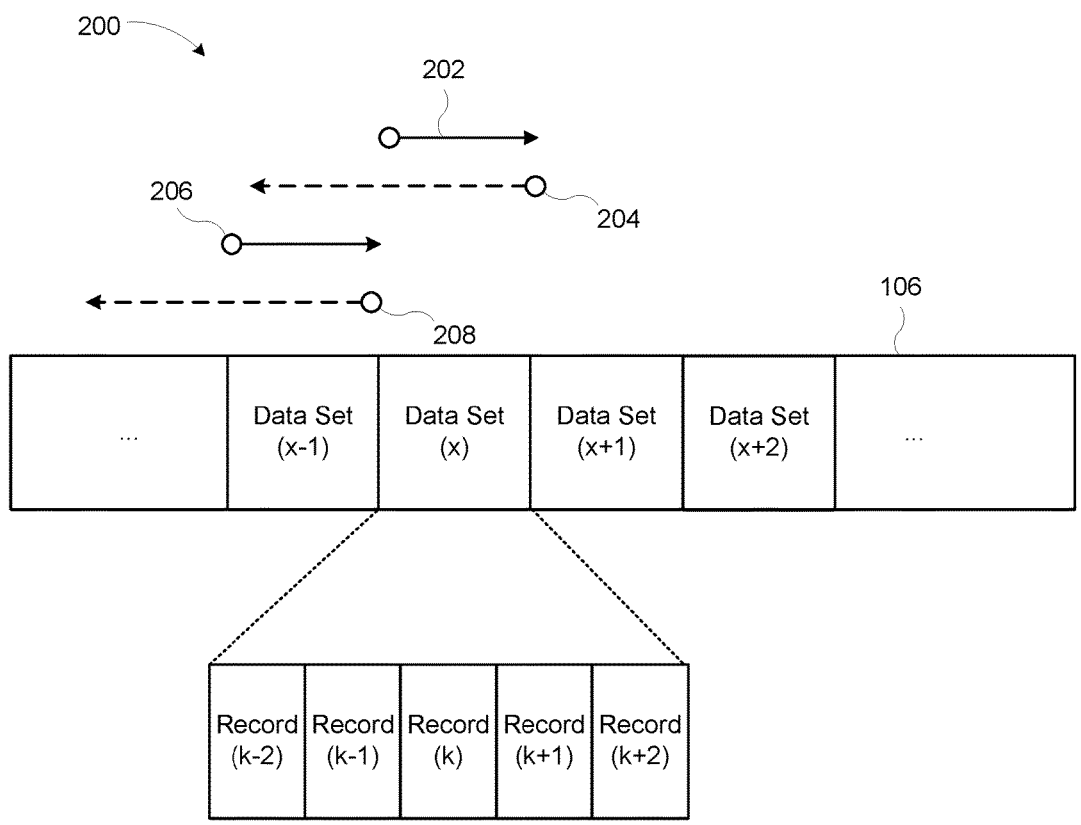
FIG. 2 is a schematic block diagram illustrating one embodiment of an arrangement of data on a tape in accordance with of the present invention.

FIG. 2 is a schematic block diagram illustrating one embodiment of an arrangement 200 of data on a tape 106 in accordance with of the present invention. The illustrated embodiment of the data arrangement 200 is stored on the tape 106. The tape 106 of FIG. 2 may be similar to the tape 106 described above relative to FIG. 1.

In the illustrated embodiment, records (i.e. Record (k−2) to Record (k+2) stored in Data Set (x)) are organized into Data Sets (i.e. Data Set (x−1) through Data set (x+2)). Data Set (x) is shown in an exploded view to illustrate the corresponding plurality of records.

In one embodiment, the data is written to the tape 106 in a sequential order. For example, Data Set (x−1) would be written first, then Data Set (x), followed by Data Set (x+1) and so on. Reading the tape 106, however, can be done in a non-sequential manner based on the record or records requested to be read. For example, if Record (k) is requested to be read, the tape 106 may be moved until a read head is at the beginning of Data Set (x). The read head would then perform a read operation 202. During the read operation, Record (k−2) through Record (k+2) are written to a buffer (such as the data buffer 112 described above with reference to FIG. 1). The requested record, Record (k), is then sent from the buffer to the requesting entity.

If the next requested record resides in Data Set (x−1), the tape 106 must be back-hitched to buffer Data Set (x−1) so that the requested record may be sent to fulfill the request. In some cases, multiple records may be requested in a certain order. For example, a host or other entity may request records in the order of (k), (k−1), (k−2), (k−3), (k−4), etc. In this case, the Records (k), (k−1), and (k−2) are read to the data buffer during the read operation 202. However, Record (k−3) has not been read to the data buffer. The tape 106 must be back-hitched 204 to read 206 Data Set (x−1). If the requested Records further extend to data sets before Data Set (x−1), further back through an additional back-hitch 208. Continued requests for records located in a backward direction from the present location on the tape 106 may require multiple back-hitches.

To reduce the number of back-hitches, a read-behind mode is activated. The read-behind mode extends the adjustment of the tape position to facilitate buffering of additional data sets over and above the typical buffer size.

In the illustrated embodiment, after the reading operation 202 on Data Set (x), the tape 106 is positioned at the end of Data Set (x). In response to a trigger event (i.e. a backward oriented read request or number of backward oriented read requests), a read-behind mode may be activated. In the read-behind mode, in response to a read request for data not stored in the data buffer and located behind the current position of the tape 106, the tape 106 is back-hitched or rewound to a data set behind the data set containing the record to which the read request corresponds.

In some embodiments, the distance the tape 106 is back-hitched or rewound is a predetermined value. For example, the distance may be a number of data sets, a number of records, a number of bits or bytes of data, a physical distance on the tape 106, or other measure. In some embodiments, the distance is a distance from the location of the data requested to be read or from the current location of the tape 106. In some embodiments, the distance is static.

In other embodiments, the distance is dynamic. For example, the dynamic distance may vary based on requests (i.e. the amount of data requested in the current request, requests pending, or requests occurring over a period of time), characteristics of the tape drive (i.e. read speed, read head movement speed, amount of data on the tape, demand on the tape drive, power consumption requirements), requesting entity (i.e. the host 104), or other variables.

Figure 3:
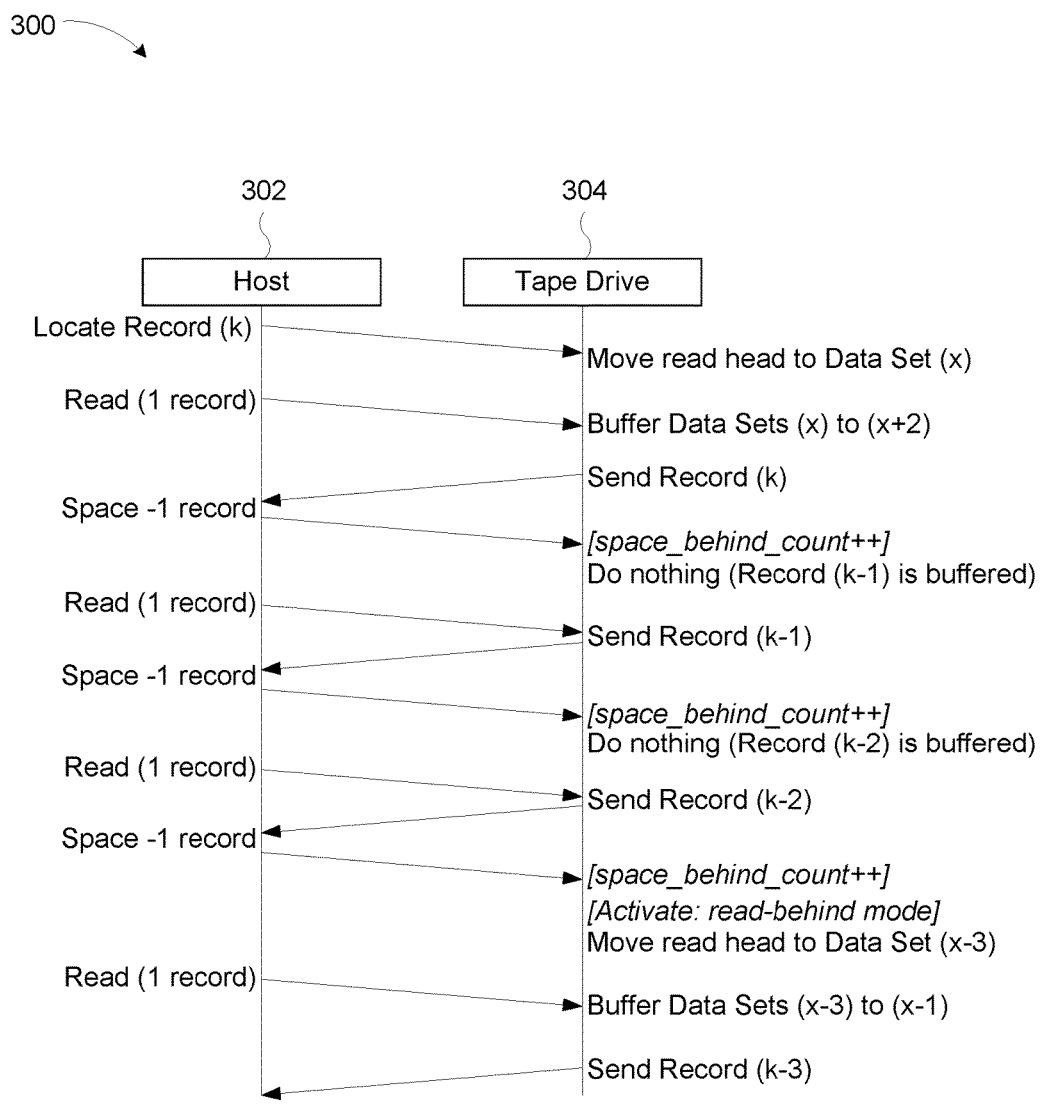
FIG. 3 is an interaction diagram illustrating one embodiment of a host-tape drive interaction in accordance with of the present invention.

FIG. 3 is an interaction diagram illustrating one embodiment of a host-tape drive interaction 300 in accordance with of the present invention. The interaction described below refers to the organization of the data sets and records as depicted in the embodiment shown in FIG. 2. Please refer to FIG. 2 for reference. While the illustrated embodiment of FIG. 3 shows direct communication between the host 302 and the tape drive 304, other embodiments include additional devices or systems through which the communication may pass or be interpreted or modified.

The illustrated embodiment of FIG. 3 depicts the interaction between the host 302 and the tape drive 304. In the illustrated embodiment, the host 302 issues a Locate Record (k) command to the tape drive 304. In response, the tape drive 304 moves the read head to the location of Data Set (x) which includes the requested record (Record (k)).

The host 302 then sends a Read command for a single record. In some embodiments, the Read command is issued in response to receipt of a confirmation from the tape drive 304 that the read head is positioned to read the located record (Record (k)). In response to the Read command from the host 302, the tape drive 304 buffers Data Set (x), Data Set (x+1), and Data Set (x+2).

While the illustrated embodiment buffers three separate data sets, other embodiments buffer fewer or more data sets. For example, the tape drive 304 may buffer only the data set containing the requested record. The tape drive 304 may also buffer additional data sets to reduce the number of read head movements required to fulfill requests for nearby records which are not on the data set corresponding to the currently requested record.

Once Data Sets (x) to (x+2) are buffered, the tape drive 304 sends the requested Record (k) to the host 302. In some embodiments, the tape drive 304 waits to send the requested record until buffering of each of the Data Sets (x) to (x+2) is complete. In other embodiments, the tape drive 304 sends Record (k) to the host 302 once the data set corresponding to the requested record is fully buffered. In a further embodiment, the tape drive 304 sends the requested Record (k) in response to a determination that Record (k) is buffered and while the rest of Data Set (x) is buffering.

In the illustrated embodiment, in response to receipt of Record (k) from the tape drive 304, the host 302 issues a Space-1 record command to request the record one space ahead of Record (k). Because the record that is located before Record (k), Record (k−1), is stored on the buffer, it is not necessary to move the read head to provide the data at the specified location to the host 302. Tape drive 304 then sends Record (k−1) from the buffer to the host 302.

Also, in response to the Space-1 record command, the tape drive 304 increments a counter. In the illustrated embodiment, the counter is incremented with a "space_behind_count++" command. Other structures, languages, or commands may be used to increment the counter. In the illustrated embodiment, the counter value would now be equal to one. In some embodiments, the counter is initialized upon detection of the space-1 record command. In other embodiments, the counter is initialized in response to a first interaction with the host 302 (i.e. the Locate Record (k) command). Other events may be used as trigger events for initializing the counter.

The host 302 then sends a Read (1 record) request to the tape drive 304 which send Record (k−1) back to the host 302. A further Space-1 record command from the host 302 increments the counter again and the tape drive 304 prepares to send Record k−2) from the buffered data. The host 302 provides the Read (1 record) command and the tape drive 304 responds with Record (k−2) from the buffer.

A third Space-1 record command is issued by the host 302 and received by the tape drive 304. This increments the counter to a value of three. In the illustrated embodiment, the threshold for a read-behind mode is set at three and the read-behind mode is activated in response to a determination that the counter value has reached three. In other embodiments, the threshold is set to lower or higher values.

Because the Space-1 record corresponds to data at a location on the tape drive 304 that has not been buffered, the read head must be moved. In response to the subsequent Read (1 record) command, the tape drive 304 moves the read head. Because the read-behind mode is active, the tape drive 304 moves the read head past the target Data Set (x−1) which corresponds to the requested record (Record (k−3)) and buffers additional data sets to prevent or reduce the number of future back-hitches/rewinds needed to read further data behind the previously requested record.

As described above, the distance that the read head is moved is determined by a value associated with the read-behind mode. In some embodiments, the distance value is a static number. In other embodiments, the distance value is a dynamic number which varies based on one or more variable such as request history, efficiency standards, buffer size, etc.

After the read head is moved to the location as dictated by the read-behind mode, the tape drive 304 buffers the data up to the previously buffered data sets. In some embodiments, the tape drive 304 overwrites the previously buffered data. In other embodiments, the tape drive 304 adds the newly read data sets to the previously buffered data sets on the buffer. In further embodiments, the tape drive 304 buffers the newly read data sets and rebuffers the previously read data sets, overwriting the previous buffer. Other buffering strategies and approaches may be used.

In the depicted embodiment, the tape drive 304 receives continuous requests for records located in a backwards direction relative to the reading direction. In some embodiments, the counter is reset is a request is received which specifies a record that is downstream from the previously requested record. In other embodiments, the counter is incremented with a tolerance for a number of forward read requests mixed with backward read requests. Various approaches to counter management may be implemented.

Figure 4:
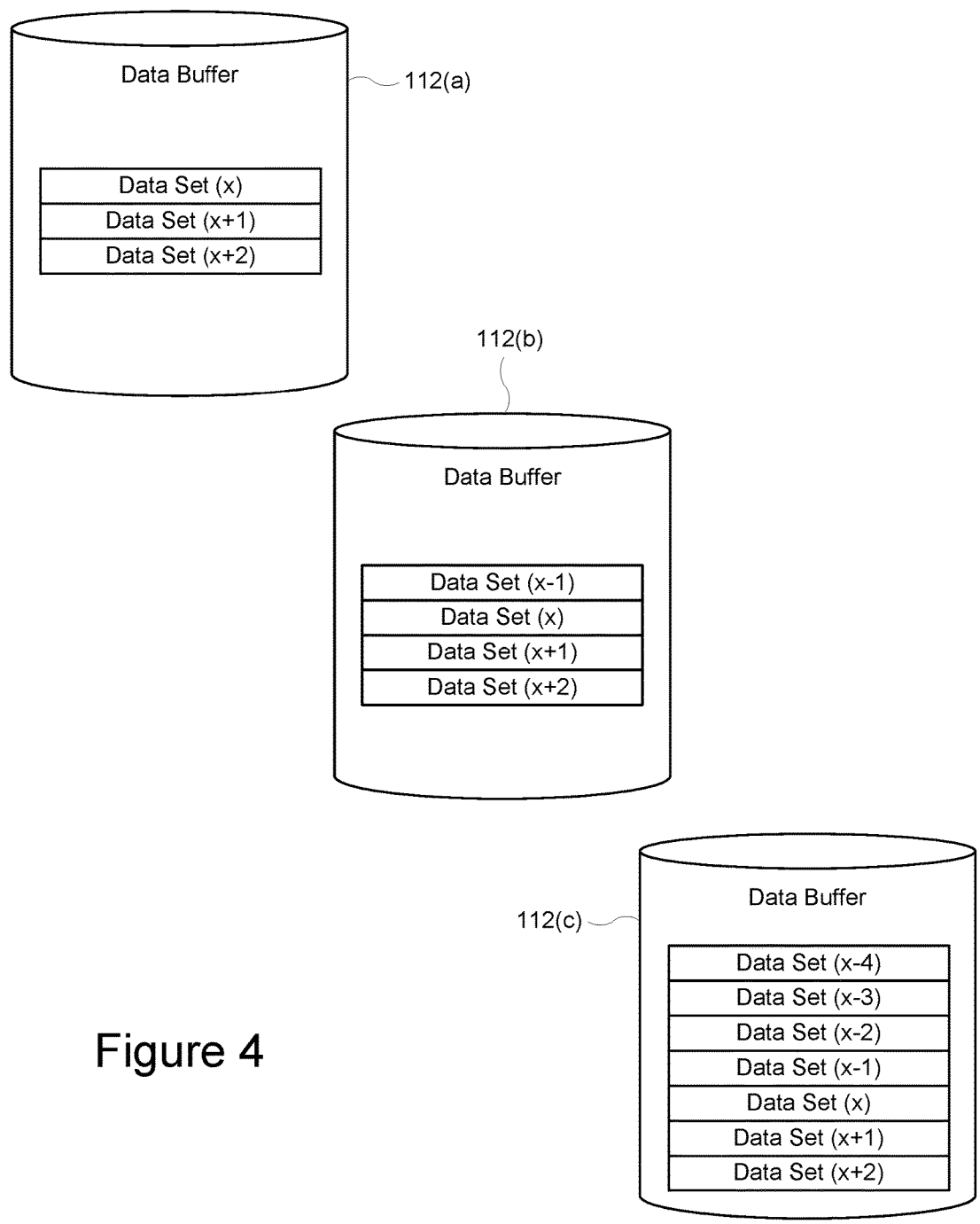
FIG. 4 is a schematic block diagram illustrating one embodiment of a plurality of storage states of a data buffer of a tape drive.

FIG. 4 is a schematic block diagram illustrating one embodiment of a plurality of storage states (112(a), 112(b), and 112(c)) of a data buffer 112 of a tape drive. The first data buffer 112(a) includes Data Sets (x) through (x+1). At this stage, the tape drive has received only an initial request for records. In response to the request, the tape drive has buffered Data Set (x) through Data Set (x+2). In some embodiments, the illustrated buffering is executed in response to an initial read request for a record contained in one or more of the data sets stored in the buffer 112(a).

The second data buffer 112(b) illustrates a state in which the tape drive is not in an active read-behind mode. In response to a request for a record stored in Data Set (x−1), which is backwards from Data Set (x), the tape drive back-hitches the tape and buffers only the next data set, Data Set (x−1). In some embodiments, the second data buffer 112(b) only adds Data Set (x−1) because the read-behind mode is not active because the threshold value for activating the read-behind mode has not been reached. Alternatively, the data buffer 112(b) may only add Data Set (x−1) because Data Set (x−1) is the first data set on the tape, or another determination has adjusted the counter threshold dynamically. Other situations may result in a single or reduced number of data sets being buffered to the data buffer 112(b).

The third data buffer 112(c) illustrates a state in which the tape drive is in an active read-behind mode. In the illustrated embodiment, the data buffer 112(c) receives and stores Data Sets (x−4) to (x−1) in response to a request for a record stored in Data Set (x−1). The buffering of the additional data sets reduces the number of back-hitches to acquire records from data sets behind the previous records.

The illustrated embodiment buffers four total data sets in response to a read request that is backward from the previously buffered data sets. In other embodiments fewer or more data sets may be buffered based on a distance determination which may provide a static or dynamic value as described above.

Figure 5:
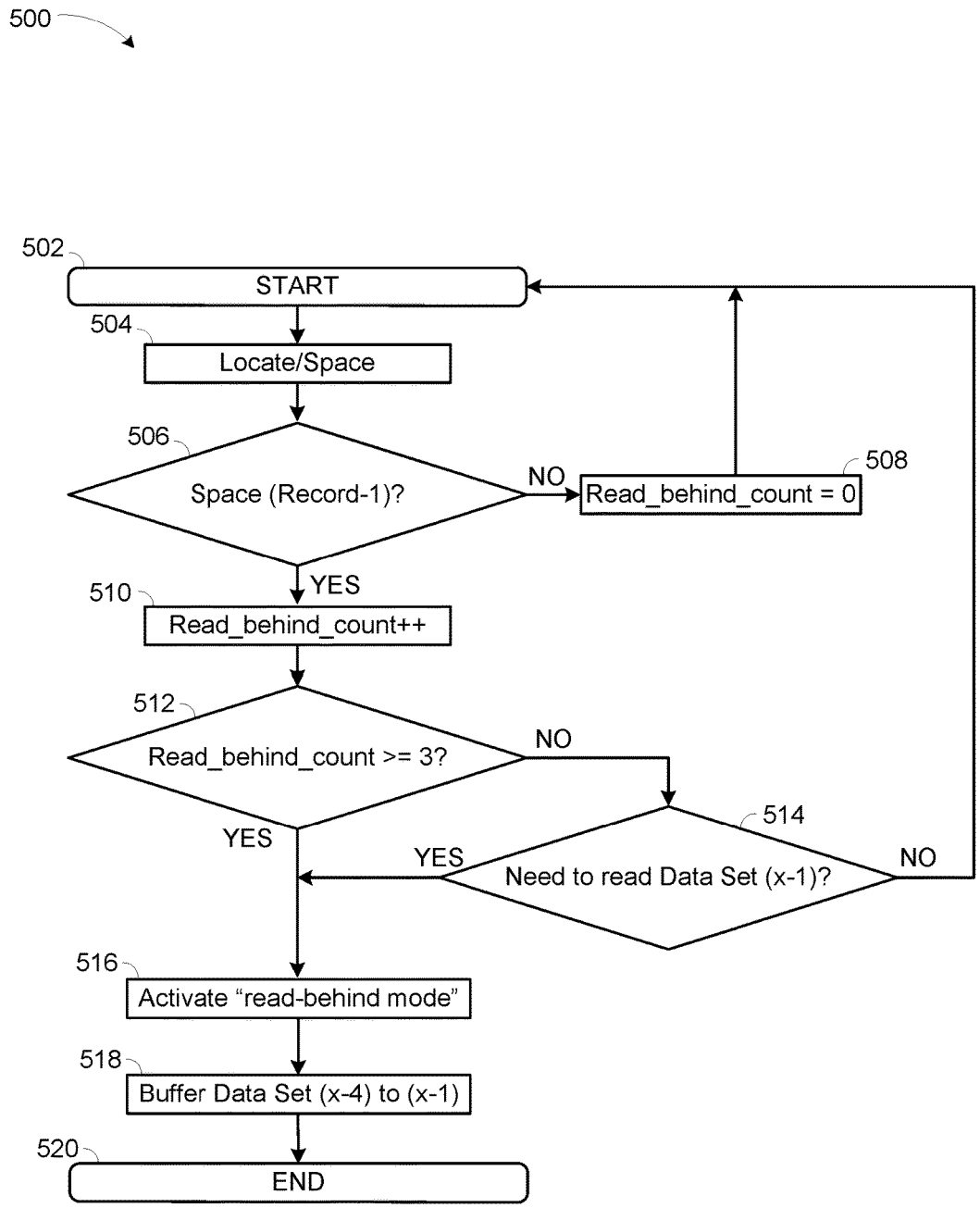
FIG. 5 is a schematic flow chart diagram illustrating one embodiment of a method for accessing a tape in accordance with the present invention.

FIG. 5 is a schematic flow chart diagram illustrating one embodiment of a method 500 for accessing a tape in accordance with the present invention.

In the illustrated embodiment, the method 500 starts at block 502. At block 504, the tape drive receives a Locate/Space command. In some embodiments, the Locate/Space command instructs the tape drive to prepare to read a record from a location that is a specified value from the previously requested record. In some embodiments, the Locate/Space command specifies a specific location without relation to the previously requested record.

At block 506, the tape drive determines if the command from the host is in a backwards or −1 direction. If the command is not in the backwards direction, the method 500 proceeds to block 508. At block 508, the counter is reset to zero because the request applies to a record in a forward direction which does not require back-hitching. In some embodiments, the decision at block 506 is more complex. For example, the determination may be based on a pattern of requests, a characteristic of the drive or data on the tape, an efficiency metric for the tape drive, or other criteria.

If, at block 506, the determination is that the request is for a record located behind the previous record, at block 510, the counter increments the value. At block 512, the tape drive verifies the counter value. If the counter value is not greater than three, the method proceeds to block 514. At block 514, the tape drive determines if the read request necessitates reading the data set, Data Set (x−1), behind the currently buffered data sets. If the read request does not require buffering of Data Set (x−1) at block 514, then the method 500 restarts at block 502.

If, at block 514, it is determined that Data Set (x−1) needs to be read to fulfill a request the method 500 proceeds to block 516. Additionally, if it is determined that the counter has a value greater than three at block 512, the method 500 also proceeds to block 516. At block 516, the read-behind mode is activated by the tape drive.

At block 518, the tape drive buffers Data Sets (x−4) to (x−1) in accordance with the active read-behind mode. In some embodiments, the tape drive reads fewer or more than the four Data Sets (x−4) to (x−1) mentioned above.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for accessing a tape, the method comprising:
receiving a read request for a record stored on the tape, wherein the tape is mounted in a tape drive comprising a data buffer and the tape stores data as a plurality of data sets, each of the plurality of data sets containing one or more records;
buffering at least one of the plurality of data sets to the data buffer, the at least one of the plurality of data sets comprising a target data set comprising the requested record;

monitoring read operations on the tape to count a number of continuous read operations occurring in a backward direction relative to the tape;

setting a counter to zero in response to a detection of a read operation in a forward direction;

incrementing the counter in response to detection of a read operation in the backward direction; and in response to the number of continuous read operations occurring in a backward direction reaching a threshold, activating a read-behind mode that executes an extended buffer operation on data preceding a record requested to be read next.

2. The method of claim 1, wherein the counter is incremented in response to an issue of a Space command in the backward direction.

3. The method of claim 1, wherein activating the read-behind mode comprises:

determining whether the target data set containing the record is buffered in the data buffer;

in response to a determination that the target data set is buffered in the data buffer, determining whether the read-behind mode is active;

in response to a determination that the read-behind mode is active, buffering data from the tape starting at a predetermined distance from the record requested to be read next.

4. The method of claim 1, wherein the extended buffer operation comprises dynamically determining a distance ahead of the next requested record at which the extended buffer operation will begin.

5. The method of claim 1, further comprising dynamically setting the threshold for the number of continuous read operations.

6. A system comprising:

a memory;

a tape drive comprising a data buffer; and a processor communicatively coupled to the memory and the tape drive, the memory comprising instructions which, when executed by the processor, cause the processor to:

receive a read request for a record stored on a tape mounted in the tape drive, the tape stores data as a plurality of data sets, each of the plurality of data sets containing one or more records;

buffer at least one of the plurality of data sets to the data buffer, the at least one of the plurality of data sets comprising a target data set comprising the requested record;

monitor read operations on the tape to count a number of continuous read operations occurring in a backward direction relative to the tape;

set a counter to zero in response to a detection of a read operation in a forward direction;

increment the counter in response to detection of a read operation in the backward direction; and in response to a determination that the number of continuous read operations occurring in a backward direction has reached a threshold, activate a read-behind mode that executes an extended buffer operation on data preceding a record requested to be read next.

7. The system of claim 6, wherein the counter is incremented in response to an issue of a Space command in a backward direction.

8. The system of claim 6, wherein activating the read-behind mode comprises:

determining whether the target data set containing the record is buffered in the data buffer;

in response to a determination that the target data set is buffered in the data buffer, determining whether the read-behind mode is active;

in response to a determination that the read-behind mode is active, buffering data from the tape starting at a predetermined distance from the record requested to be read next.

9. The system of claim 6, wherein the extended buffer operation comprises a dynamic determination of a distance ahead of the next requested record at which the extended buffer operation will begin.

10. The system of claim 6, further comprising dynamically setting the threshold for the number of continuous read operations.

11. A computer program product for accessing a tape, the computer program product comprising a computer readable storage medium having program instructions embodied therewith, the program instructions executable by a processor to cause the processor to:

receive a read request for a record stored on the tape mounted in a tape drive comprising a data buffer, the tape stores data as a plurality of data sets, each of the plurality of data sets containing one or more records;

buffer at least one of the plurality of data sets to the data buffer, the at least one of the plurality of data sets comprising a target data set comprising the requested record;

monitor read operations on the tape to count a number of continuous read operations occurring in a backward direction relative to the tape;

set a counter to zero in response to a detection of a read operation in a forward direction;

increment the counter in response to detection of a read operation in the backward direction; and in response to a determination that the number of continuous read operations occurring in a backward direction has reached a threshold, activate a read-behind mode that executes an extended buffer operation on data preceding a record requested to be read next.

12. The computer program product of claim 11, wherein the program instructions further cause the processor to:

determine whether the counter has a value more than a predetermined value; and enter Read-Behind-Mode in response to determining that the counter has a value more than the predetermined value.

13. The computer program product of claim 11, wherein activating the read-behind mode comprises:

determining whether the target data set containing the record is buffered in the data buffer;

in response to a determination that the target data set is buffered in the data buffer, determining whether the read-behind mode is active;

in response to a determination that the read-behind mode is active, buffering data from the tape starting at a predetermined distance from the record requested to be read next.

14. The computer program product of claim 11, wherein the extended buffer operation comprises a dynamic determination of a distance ahead of the next requested record at which the extended buffer operation will begin.

15. The computer program product of claim 11, further comprising dynamically setting the threshold for the number of continuous read operations.

* * * * *